(12) United States Patent
Strengsholt et al.

(10) Patent No.: US 12,187,554 B2
(45) Date of Patent: Jan. 7, 2025

(54) DESTACKER UNIT AND SYSTEM FOR DESTACKING OF OBJECTS

(71) Applicant: JS STÅL APS, Nørresundby (DK)

(72) Inventors: Thomas Strengsholt, Nørresundby (DK); René Hansen, Nørresundby (DK)

(73) Assignee: JS STÅL APS, Nørresundby (DK)

( * ) Notice: Subject to any disclaimer, the term of this patent is extended or adjusted under 35 U.S.C. 154(b) by 0 days.

(21) Appl. No.: 18/251,768

(22) PCT Filed: Nov. 4, 2021

(86) PCT No.: PCT/EP2021/080656
§ 371 (c)(1),
(2) Date: May 4, 2023

(87) PCT Pub. No.: WO2022/096581
PCT Pub. Date: May 12, 2022

(65) Prior Publication Data
US 2024/0002173 A1    Jan. 4, 2024

(30) Foreign Application Priority Data
Nov. 4, 2020   (DK) .............................. PA202070730

(51) Int. Cl.
*B65G 59/10*   (2006.01)
*B65G 59/06*   (2006.01)

(52) U.S. Cl.
CPC ......... *B65G 59/108* (2013.01); *B65G 59/066* (2013.01)

(58) Field of Classification Search
CPC .. B65G 59/108; B65G 59/103; B65G 59/066; B65G 59/102
See application file for complete search history.

(56) References Cited

U.S. PATENT DOCUMENTS

| | | |
|---|---|---|
| 1,096,499 A | 5/1914 | Lewis |
| 3,032,237 A | 5/1962 | Erickson |
| 3,074,594 A | 1/1963 | Cheeley |

(Continued)

FOREIGN PATENT DOCUMENTS

| | | |
|---|---|---|
| DK | 177644 B1 | 1/2014 |
| EP | 1048596 A2 | 11/2000 |

(Continued)

*Primary Examiner* — Gregory W Adams
(74) *Attorney, Agent, or Firm* — DINSMORE & SHOHL LLP (57) ABSTRACT

A destacker unit for a destacking system is for destacking objects with a flange that are stacked together, such as a stack of trays, containers, cups or other objects. A destacking system includes at least one destacker unit for repeated destacking of one tray at a time in a predetermined direction. A stack of objects each having a flange extending outwards along its perimeter may be destacked in a predetermined direction by rotational motion of the destacker unit. The destacker unit may include a wheel unit, having a threaded rotation axis, including: a lower surface for carrying the stacked objects, and an inclined member located above the lower surface and having an inclined upper surface and a bottom surface. The distance between the upper and bottom surface increases around at least a part of the periphery of the wheel unit. The thread orientation corresponds to the inclination of the surface.

19 Claims, 4 Drawing Sheets

(56) References Cited

U.S. PATENT DOCUMENTS

| | | | | | |
|---|---|---|---|---|---|
| 3,220,568 | A | * | 11/1965 | Voyce | H01F 41/024 414/788.2 |
| 4,048,915 | A | * | 9/1977 | Martin | B65G 59/108 221/222 |
| 4,180,180 | A | * | 12/1979 | Fries, Jr. | B65G 59/108 221/222 |
| 4,260,311 | A | * | 4/1981 | Hanses | B31B 50/00 156/196 |
| 5,518,149 | A | * | 5/1996 | Lotspeich | G07F 13/10 221/241 |
| 6,761,080 | B2 | * | 7/2004 | Lange | F16H 25/2015 74/424.81 |
| 9,457,968 | B2 | * | 10/2016 | Miedema | B65G 59/108 |
| 2005/0109653 | A1 | | 5/2005 | Wnek | |
| 2017/0334668 | A1 | | 11/2017 | Fickler | |
| 2019/0283983 | A1 | * | 9/2019 | Fickler | B65G 59/061 |

FOREIGN PATENT DOCUMENTS

| | | | | |
|---|---|---|---|---|
| EP | 2186760 | A1 | 5/2010 | |
| EP | 3023370 | B1 | 8/2017 | |
| EP | 3363752 | A1 | 8/2018 | |
| EP | 3511273 | A1 | 7/2019 | |
| EP | 3566985 | A1 | 11/2019 | |
| EP | 3643650 | A1 | 4/2020 | |
| GB | 2156326 | A * | 10/1985 | A47L 15/247 |
| WO | 2005/044103 | A1 | 5/2005 | |
| WO | 2015/028022 | A1 | 3/2015 | |
| WO | 2016/034179 | A1 | 3/2016 | |
| WO | 2018/137742 | A1 | 8/2018 | |
| WO | 2019/154471 | A1 | 8/2019 | |

* cited by examiner

DESTACKER UNIT AND SYSTEM FOR DESTACKING OF OBJECTS

CROSS-REFERENCE TO RELATED APPLICATIONS

This application is the U.S. National Stage of PCT/EP2021/080656 filed on Nov. 4, 2021, which claims priority to Denmark Patent Application PA202070730 filed on Nov. 4, 2020, the entire content of both are incorporated herein by reference in their entirety.

FIELD OF THE INVENTION

The present disclosure relates to a destacker unit for a destacking system for destacking objects with a flange that are stacked together, such as a stack of trays, containers, cups or other objects. Furthermore, the present disclosure relates to a destacking system comprising at least one of said destacker units for repeated destacking of one tray at a time in a predetermined direction. The present disclosure further relates to a method for destacking a flanged object from a stack of flanged objects,

BACKGROUND OF THE INVENTION

Trays, cups, and containers are commonly used products in many production lines in various industries, especially in food, consumer products and medical packaging industry. It is common practise to store the trays on top of each other for optimising the logistics and ease the handling during delivery and processing. However, stored trays may engage too tightly in the stack resulting in bottlenecks in production.

During processing of some products, such as food, consumer goods or medical products, using an automatic system is very important in order to ensure that the product is carefully and precisely placed into a desired tray. Especially in large volume production, an automated production line with high accuracy and reliability must be ensured. Such automation calls for a quick and accurate destacking system, which would lead to a high efficiency rate while avoiding material losses, additional operational costs and otherwise require manual labour work to separate individual trays that are stacked.

State of the art shows that various apparatus and systems are developed to destack trays of same types. For example, EP2186760 discloses a destacker member having a steering profile along the outer rim for detaching a container from a container stack. The steering profile comprises a container-receiving end and a container-discharging end while it can be rotated with a step motor. WO 2005/044103 relates to an apparatus for dispensing of stacked objects, the dispensing apparatus comprises at least one guiding means for guiding the stack of objects and at least one dispensing unit for repetitive dispensing of at least one object at a time. The dispensing unit furthermore comprises supporting members for supporting a first object being an outermost object and intended for immediate subsequent release, and for supporting a second object being an object neighbouring the first object and situated between the first object and the remaining stack of objects. US 2017/334668 discloses a destacker unit for a destacking system such that a stack of objects each having a flange extending outwards along its perimeter is destacked in a predetermined direction by rotational motion of the destacker unit.

One disadvantage of the above-mentioned systems is that they rely on the interaction between the edge of a tray-receiving member or a support member separating the lowermost tray and disregarding any adjustability that is needed during high-speed production. Hence, the mechanical construction requires a careful assembly of supporting planes providing a planar surface.

Another disadvantage of such systems are that they cannot compensate the error that may occur during destacking of a previous tray. If trays are stacked together due to a lack of engagement or an introduced vibrational voice, such systems are prone to accumulate the error that may result in production stops.

The reliability of a destacking system during high-speed production is often overlooked. Speed, control and the maintenance of a destacking system is key when used in high-speed filling processes. In many situations, the trays are stacked very closely together such that a full separation between trays during production is not ensured. In some situations, destacking system is designed specifically for a limited type of a flange geometry. In other situations, destacking systems are prone to a failure, as the mechanical construction relating to synchronising does not allow a high-speed process with a system control. Thus, there is a great demand for an improved destacking system.

SUMMARY OF THE INVENTION

Considering the prior art described above, it is a purpose of the present disclosure to provide a destacker unit, a destacking system and a method for destacking an object from a stack of objects, such as containers, trays, such that high reliability of separation and dispensing of an object is achieved at high production speed.

In general the present disclosure relates to a destacking system for destacking objects from a stack of objects, each object having a flange extending outwards along its perimeter. The objects are preferably destacked in a predetermined direction. The presently disclosed destacking system employs rotational motion of destacker units and converts this rotational motion into linear displacement by means of threaded engagement. This linear displacement provides the force necessary to destack an object from a stack of object. One advantage of the presently disclosed approach is the provision of an inclined surface on the destacker units which is utilized to reduce the linear displacement of the stack of objects during destacking operation, such that the linear displacement of the destacker units is primarily utilized to destack the bottom object(s) from the stack of objects whereas the remaining objects in the stack is kept more still by sliding on the inclined surface.

Another advantage of the presently disclosed approach is that a reciprocal rotational motion of the destacker units can be provided by means of an actuator, such as a linear actuator, providing a cost-efficient, fast and reliable way of precisely controlling the necessary angular extension of the destacker units for a specific destacking application.

One embodiment of the present disclosure relates to a destacker unit for a destacking system such that a stack of objects each having a flange extending outwards along its perimeter is destacked in a predetermined direction by rotation of the wheel unit. The destacker unit comprises a wheel unit comprising a lower surface for carrying the stacked objects and an inclined member located above the lower surface. The inclined member has an inclined upper surface defining an inclination peripherally around the wheel unit. The inclined member further comprises a bottom surface having an peripherally around the wheel unit which is less than the inclination of the inclined upper surface, such that the distance between the inclined upper surface and the bottom surface of the inclined member increases around the wheel unit. The destacker unit further comprises a central threaded axis defining a rotation axis of the wheel unit. This thread may be part of the wheel unit, e.g. in the form of a nut. The central threaded axis can thereby engage with a threaded shaft, such that rotation of the wheel unit relative to the threaded shaft will lead to a linear displacement of the wheel unit along the rotation axis of the wheel unit. The threaded shaft may be part of the presently disclosed destacker unit.

The orientation of the thread is preferably selected to correspond to the inclination of the inclined surface of the inclined member of the wheel unit. In that regard the inclination of the inclined surface may be within +/−30% of the pitch of the thread, more preferably within +/−20%, even more preferably within +/−10%, most preferably within +/−5% of the pitch of the thread. In a preferred embodiment of the presently disclosed destacker unit the pitch of the thread corresponds to the inclination of the inclined surface of the inclined member, such that linear displacement of the wheel unit along the rotation axis, from rotation of the wheel unit relative to the threaded shaft, maintains the inclined surface at the same position relative to the rotation axis. However, even if inclination of the inclined surface is within 30% of the pitch of the thread, this will reduce the linear displacement of the inclined surface during rotation of the wheel unit.

The present disclosure further relates to a destacking system comprising a plurality of said destacker units, such as between 1 and 10 destacker units, such as four destacker units.

The present disclosure further relates to a method for destacking an object from a stack of objects, the method comprising the steps of
- providing a stack of objects arranged substantially vertical, each object having a flange extending outwards along its perimeter,
- providing a plurality of the presently disclosed destacker units or the presently disclosed destacking system,
- separating at least one lowermost object from the stack of objects by means of the destacker units by carrying a bottom object of the stack object on the lower surface and engaging the flange of an object above the bottom object with the inclined member, and
- rotating and vertically displacing the wheel units such that the bottom object is displaced downwardly and destacked by the inclined member whereas the stack of remaining objects slides on the inclined upper surface of the inclined member.

The presently disclosed destacking approach is based on the idea of separating at least one lowermost object from a stack of objects by means of destacker units having wheel units interfacing with the stack of objects and corresponding threaded shafts, where the necessary destacking displacement comes from the threaded engagement with the shaft. The stack of objects may be a stack of containers, trays, cups, plates or as such, each object having a flange extending outwards along its perimeter.

An advantage of the presently disclosed destacker unit and associated destacker system is that the orientation of the thread can be selected to coincide with the inclination of the inclined surface of the inclined member of the wheel unit, with the further advantage that the inclination of the inclined upper surface may be selected to correspond to the pitch of the thread. The engagement of the thread of the shaft by the wheel unit will lead to a linear displacement of the wheel unit along the rotation axis. if the inclination of the inclined surface corresponds to the pitch of the thread, it can be ensured that an object, carried by the inclined upper surface of the inclined member of the wheel unit, can be maintained at the same planar height, in case the rotation axis is vertical. In particular, if a stack of objects is carried by the inclined upper surface, they may be maintained at the same height whereas the wheel unit is displaced vertically. Similarly, a bottom object, initially carried by the lower surface, can be displaced downwardly and destacked by the inclined member, in particular by the bottom surface of the inclined member, whereas the stack of remaining objects can slide on the inclined upper surface. In case the inclination of the inclined surface corresponds to the pitch of the thread, the stack of remaining objects is maintained at a fixed planar height.

It has been realized that the presently disclosed destacking approach meets a need for an advanced and efficient destacking operation such that a high reliability of separation and a smooth dispensing of tightly stacked objects is achieved even at high production speed.

BRIEF DESCRIPTION OF THE DRAWINGS

The invention will in the following be described in greater detail with reference to the accompanying drawings.

DETAILED DESCRIPTION OF THE INVENTION

As stated above a further aspect of the present disclosure relates to a destacking system comprising a plurality of the presently disclosed destacker units, for example between 1 and 10 destacker units, such as two or four destacker units. The number of destacker units in a destacking system may be varied according to the destacking application. On the other hand, it is also important to guide and retain the stack of containers in a stable configuration for an improved production line. Hence, in a preferred embodiment, two destacker units are placed on each side of the stack of objects, preferably with a distance between the destacker units that is equivalent at each side. For example, four destacker units are suitable for destacking a stack of rectangular trays as shown in the examples herein. However, for very small objects, only one or two destacker units are necessary, whereas for object with non-standard peripheral shapes, e.g. shaped like the number "9", more than four destacker units can be necessary to sufficiently guide the objects in the stack during destacking.

In one embodiment, destacking of at least one lowermost object of the stack of objects is achieved by rotating the wheel unit with a direction of rotation and a predefined angle from a starting point. The destacking system may then be configured for returning the wheel unit to the starting point by rotating the wheel unit with a direction of rotation opposite to the initial direction of rotation. After the wheel unit returns to the initial position, the procedure is repeated to achieve the destacking of at least a second subsequent lowermost object. Hence, during the first rotational motion of the destacker units, the inclined members separate at least one lowermost object from the stack of objects.

Usually it is important that the stack of objects is destacked in a predetermined direction, normally vertically downwards. In the presently disclosed destacking system, destacking is provided by rotation of the wheel units. In the preferred embodiment, a bottom object of the stack of objects is carried on the lower surface of the wheel unit in a starting position of the wheel unit. During destacking, the wheel unit rotates and the flange of the object just above the bottom object engages with the inclined member of the wheel unit whereas the bottom object of the stack is still carried by the lower surface. With further rotation of the wheel units, the distance between the inclined upper surface and the bottom surface of the inclined member increases, which forces the flange of the bottom object to separate the bottom object from the stack. As the lower surface does not extend fully around the wheel unit there is nothing to carry the bottom object allowing its free fall vertically. Hence, the bottom object is separated from the stack of objects by a combination of the inclined member separating the flanges and gravity pulling the bottom object.

In the preferred embodiment, the inclination of the inclined upper surface corresponds to the pitch of the thread. The stack of objects sliding on the inclined upper surface during rotation of the wheel unit is therefore substantially not displaced vertically while sliding on the inclined upper surface, whereas the lower surface and bottom surface of the inclined member is displaced downwardly along with the wheel unit. It is this vertical displacement of the bottom surface of the inclined member that destacks the bottom object. After destacking of an object, the wheel units can be rotated in the reverse direction back to the starting position of the wheel unit such that the stack of objects is carried by the lower surface and destacking operation can be restarted. Preferably, the stack of objects is parallel to the axis of rotation of the destacker units, which typically is oriented vertically.

The inclined member may for example extend approx. 230 degrees, such as less than 300 degrees, or less than 250 degrees, or between 180 and 270 degrees, around the periphery of the wheel unit.

In order to engage with the object above the bottom object reliably, the wheel unit may further comprise a separator plate extending radially from the wheel unit and continuously from a lower edge of the inclined member. During destacking, the wheel unit rotates and the flange of the object just above the bottom object engages with the separator plate.

The separator plate may be part of the inclined member of the wheel unit or may be a separator plate assembled to the lower end of the inclined member as a continuation of the bottom surface of the inclined member. This feature foresees that at least one bottom object is separated from the stack of objects during destacking operation. In practise, providing a sharp edge of the separator plate extending parallel to the flange of the stacked objects may enhance the reliability of the engagement.

Preferably, the separator plate is parallel to the lower surface and intersects the axis of rotation of the wheel unit perpendicularly, thereby enhancing the first interaction with the flange of the bottom object. Advantageously, a respective parallelism of lower surface and separator plate can be adjusted such that the stability of the destacking operation is enhanced.

In a further advantageous embodiment, the wheel unit further comprises a spacer located between the inclined member and the lower surface for controlling the distance between the lower surface and the inclined member, i.e. between the lower surface and the bottom surface of the inclined member. At the same time, it is clear that the height of the spacer can be selected based on the height of the flange and/or the distance between abutting objects in a stack of objects, such that at least one bottom object is separated from the stack of objects during destacking operation. The advantage of the replaceable spacer is that it can be adjusted for applications with another stack of objects having a different flange height or geometry than the first stack of objects.

In an embodiment, the wheel unit further comprises an engagement plate located above the inclined member. The engagement plate enters between two adjacent objects in the stack of objects, several objects above the bottom objects, during destacking operation, thereby providing an initial pressure relief because the engagement plate carries and possibly slightly lifts the objects above the engagement plate. Because the engagement plate provides an initial engagement with the flange of an object, it results in a pressure relief on the lower objects in the stack, hence leading to an easier engagement of the separator plate with the flange of the object above the bottom object during destacking operation. The engagement plate may for example extend approx. 90 degrees, such as less than 90 degrees, around the periphery of the wheel unit.

In a further embodiment, the inclined member, the lower surface, the separator plate and/or the engagement plate define segments on the wheel unit with a circular periphery. This foresees that the positioning of the outer circular periphery with respect to the axis of rotation and the diameter of circular segments are selected in accordance with the geometry of the object and the flange.

The radial extensions of the lower surface, inclined member, separator plate and engagement plate are advantageously selected such that sufficient surface length of the various surfaces during rotation is provided in order to effectively engage and retain the flanges of the trays while giving a room for destacking of at least one bottom tray.

Preferably, the angular extension of the lower surface around the wheel unit is smaller than the angular extension of the inclined member such that, during destacking operation, the bottom object loses the contact with the lower surface while the bottom surface of the inclined member may get in contact with the bottom object to separate the bottom object from the stack. The lower surface may for example extend approx. 180 degrees around the periphery of the wheel unit, such as less than 180 degrees, such as between 90 and 170 or 180 degrees. Destacking of the bottom object is therefore partially due to the linear displacement of the destacking unit enabling the bottom surface of the inclined member to apply a force on the bottom object depending on the speed of the rotational movement of the destacking unit.

One advantage of the presently disclosed approach is that the destacking units can be driven by an actuator. The actuator may be a mechanical, electro-mechanical, hydraulic or pneumatic actuator. In particular if a linear actuator is used the rotation of the wheel units can be controlled very efficiently and very precisely. A more cost-efficient solution is to use a pneumatic actuator. In one embodiment, the presently disclosed destacking system therefore comprises at least one actuator, such as a linear actuator, configured to drive and control the rotational motion of the destacker units—and thereby the vertical displacement of the wheel units. Engagement of the destacking units can be provided by at least one belt or chain or similar solution, e.g. a timing belt controlled by the actuator turns a pulley, which is positioned in connection with the shaft of the destacker unit.

Alternatively, the destacking units can be driven by a motor, such as a stepper motor or a servo motor. But the linear servo actuator has shown the best destacking operation.

The presently disclosed destacking approach has been shown to provide an improved destacking operation at high-speed production with a smooth run and a precise position controlling in comparison with known methods to such a degree such that operations subsequent to the destacking may proceed at faster production rates and with fewer interruptions thereby avoiding any time-consuming additional steps.

As stated previously the inclination of the inclined upper surface advantageously corresponds to the pitch of the thread such that the stack of objects resting and sliding on the inclined upper surface is maintained at a fixed planar height during destacking operation. In one embodiment the pitch of the tread is 50 mm. Consequently, the wheel unit turns about its own rotational axis, at the same time it is pulled down by the clamped shaft with a thread, with a pitch of 50 mm per turn. This means that, the stack of objects sliding on the inclined upper surface is not displaced vertically or displaced very limited when compared to the bottom object on the lower plane surface, which is displaced downwardly along with the bottom surface of the inclined member.

An advantage of the presently disclosed destacking system is that the destacking system can be configured for synchronously reciprocating the wheel units back and forth in a semi-circular motion corresponding to a rotational motion, preferably a rotational motion from 0 up to around 300 degrees, such as from 0 and up to 230 degrees, during destacking operation. It depends on the extension of the inclined member around the periphery of the wheel unit. But even if the inclined member extends more than 200 degrees around the wheel unit, a main advantage of the presently disclosed approach is that there might be processes/stack of objects where destacking with shorter displacement is adequate, e.g. reciprocation between 0-45 degree is adequate to provide efficient destacking. I.e. the presently disclosed destacking system is preferably configured such that the rotational extension of the reciprocating motion is variable according to the specific application. The shorter the rotational extension of the wheel unit during destacking, the faster destacking operation can be achieved. This reliable synchronisation, possibly driven by an actuator system, enhances the reliable use of the destacker wheel in a destacking operation in automated production. The linear extension of the actuator determines the rotational extension of the wheel unit during destacking.

Traditionally, this type of destacker unit comprises elements made of stainless steel. It is however possible to manufacture at least one element of the destacker unit from other materials such as for example—but not limited to aluminum, ceramics, composite, alloys, polymer, such as POM (Polyoxymethylene), especially the materials that are compatible to use in the food industry.

In connection with the material selection of the destacker unit, the material of the flange has also an importance. The interaction between the flange and the various surfaces of wheel unit is influenced by the tribological conditions such as friction. Hence, in order to achieve a reliable system, a sufficient attention should be paid during the material selection.

EXAMPLES

The present disclosure will now be described more fully hereinafter with reference to the accompanying exemplary embodiments shown in the drawings when applicable. However, it is to be noted that the invention may be embodied in various forms. The hereby provided embodiments are to guide a thorough and complete disclosure. Hence, embodiments set forth herein should not be interpreted as limiting but be construed as a tool for delivering the scope of the invention to those who are skilled in the art. Same reference numbers refers to the same element throughout the document.

Figure 1:
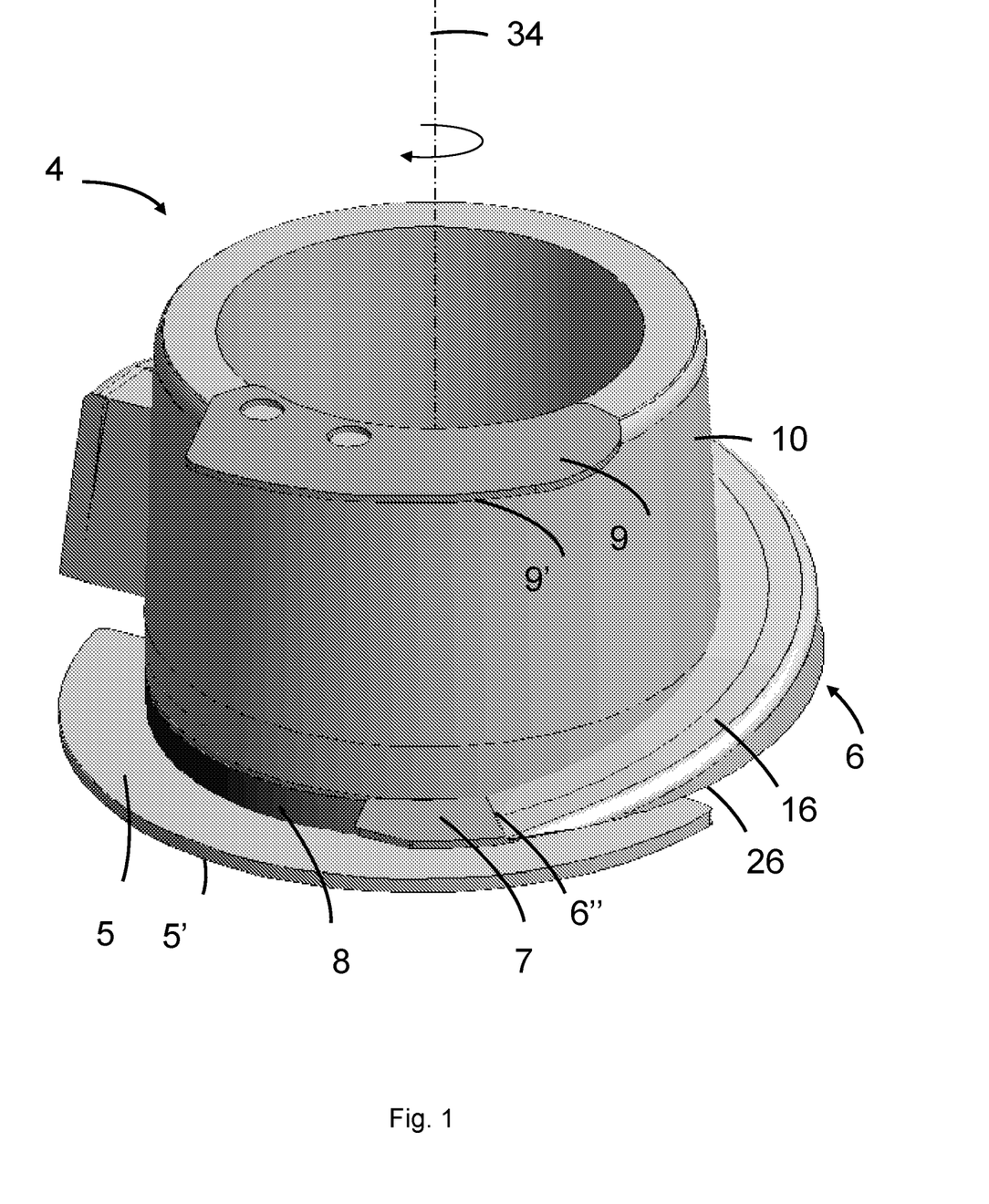
FIG. 1 shows one embodiment of the presently disclosed wheel unit.

FIG. 1 shows one embodiment of the presently disclosed wheel unit 4 of a destacker unit. The wheel unit 4 can rotate around an axis of rotation 34, which is the center of the wheel unit 4, and is provided with a lower surface 5, a spacer 8, a separator plate 7, an inclined member 6 and an engagement plate 9.

In FIG. 1, the engagement plate 9 is a segment from a circular geometry and located at the top of the wheel unit 4 such that the outer periphery of the engagement plate 9' has a larger radius than the side of the wheel unit 10. Similarly, the lower surface 5 is a segment from a circular geometry. The lower surface 5 is located at the bottom of the wheel unit 4 such that the outer periphery of the lower surface 5' has a larger radius than the side 10 of the wheel unit 4. Above the lower surface 5, an inclined member 6 with an inclined upper surface 16 having an inclination relative to the bottom surface 26 of the inclined member 6 and to the lower surface 5, is located. The inclined member 6 is arranged substantially radially with respect to the rotation axis 34 such that the inclined member 6 extends from the periphery 10 of the wheel unit 4. A separator plate 7 extends radially from the periphery 10 of the wheel unit and extends continuously from lower edge 6" of the inclined member 6. Furthermore, a spacer 8 is located between the inclined member 6 and the lower surface 5, the spacer thereby defining the vertical distance between the separator plate 7 and the lower surface 5.

Figure 2:
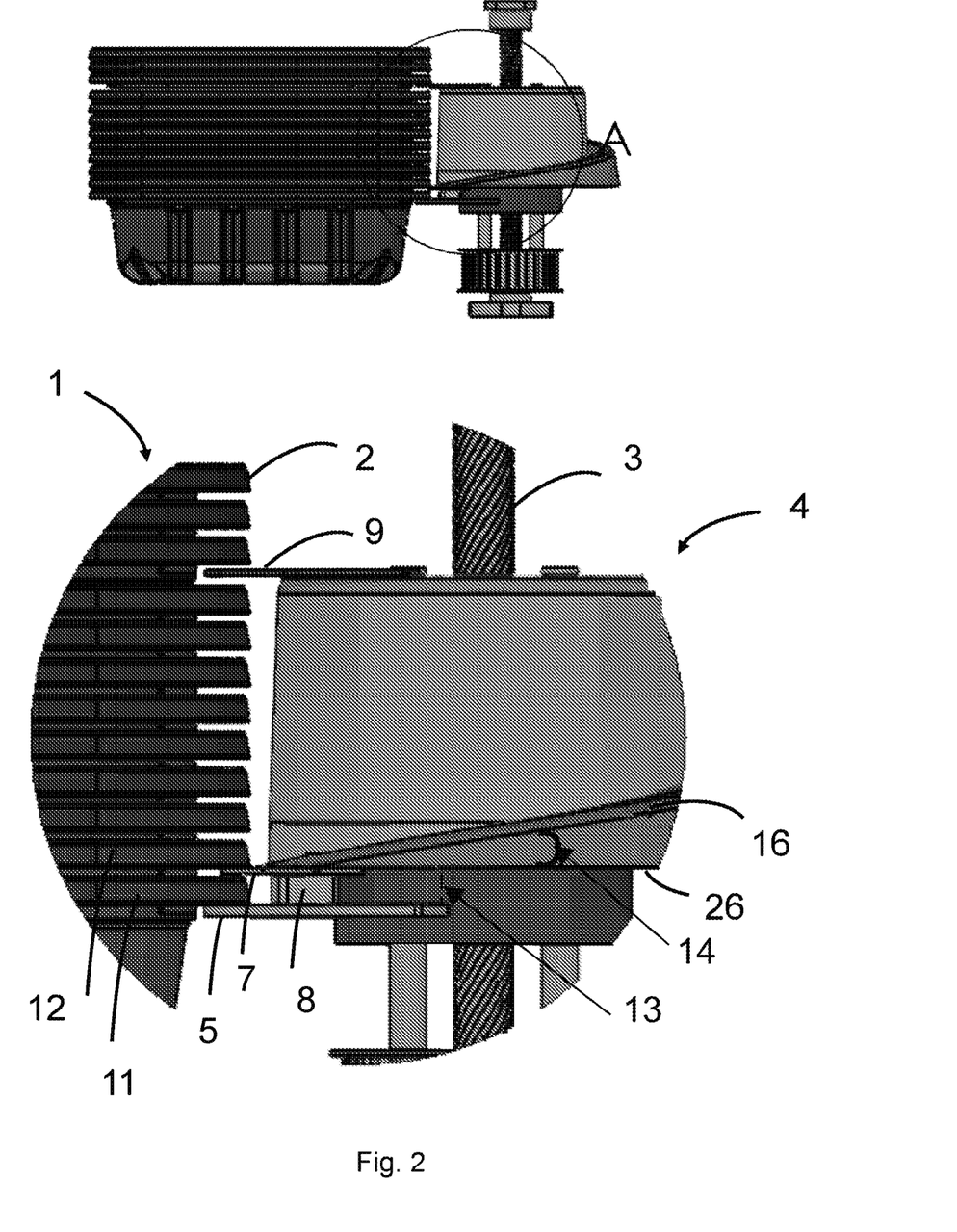
FIG. 2 is a detailed view of one embodiment of the presently disclosed destacker unit.

FIG. 2 shows a detailed view of one embodiment of the presently disclosed destacker unit. In addition to the wheel unit 4, the destacker unit further comprises a shaft 3, with a thread having a predefined pitch. The axis of rotation 34 of the wheel unit 4 coincides with the shaft 3.

Figure 3:
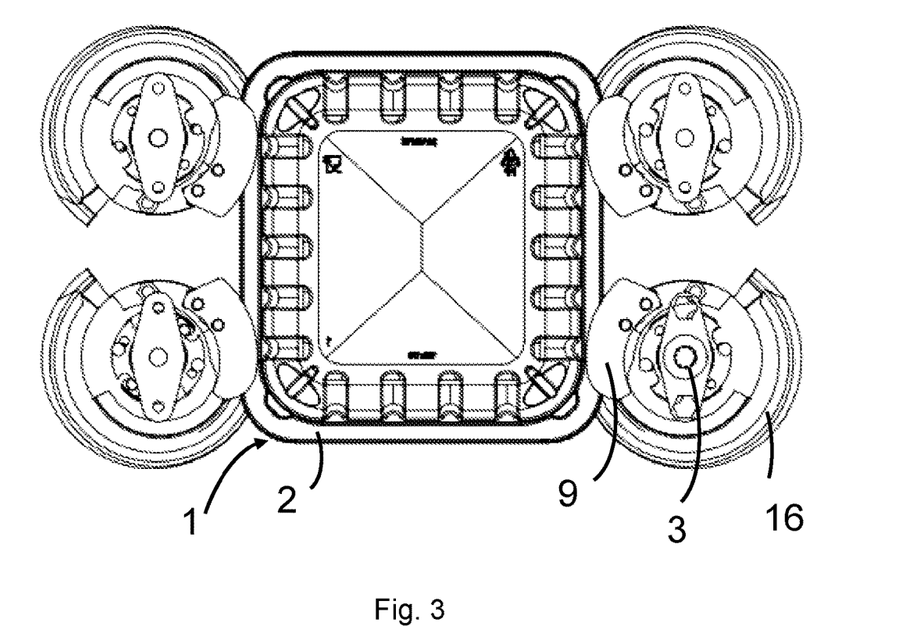
FIGS. 3-4 are schematic views of the destacking system and stack of trays seem from top and front, respectively.
Figure 4:
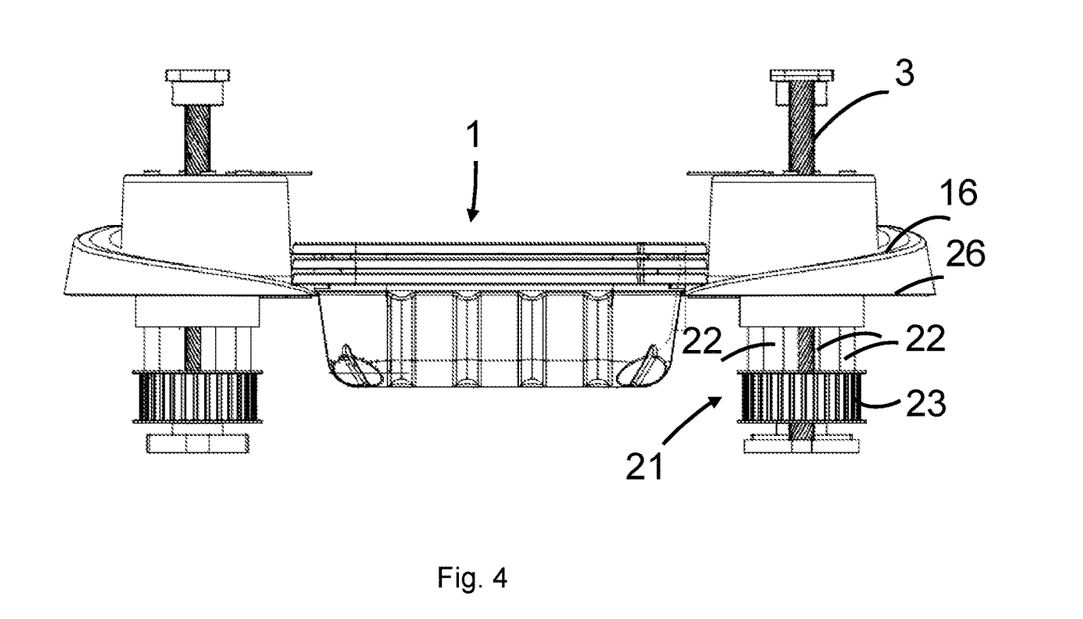

As seen in FIG. 2 the bottom surface of the inclined member 26, the lower surface 5, the separator plate 7, and the engagement plate 9 are parallel to each other and to the flanges 2 of the stack of plastic trays 1. Moreover, the inclined member 6, the lower surface 5, the separator plate 7, and the engagement plate 9 form segments with a rounded, preferably circular, peripheries. Positioning of the outer peripheries with respect to the axis of rotation and the diameter of the segments are selected to be in accordance with the geometry of the stack of trays 1 and the flange 2. The lower surface 5, the inclined member 6, the separator plate 7 and the engagement plate 9 provide sufficient contact and release during the rotation of the wheel unit 4. For example, a circular segmental geometry of the engagement plate 9 shown in FIG. 3 indicates that, if the wheel unit 4 rotates, the engagement plate 9 provides a first engagement with the flange 2 of a tray. If the wheel unit 4 rotates further, the contact between the engagement plate 9 and the flange 2 of the tray disappears allowing an engagement with the subsequent tray. Furthermore, the circular segment of the lower surface 5 is shorter than the circular segment of the bottom surface 26 of the inclined member 6 as shown in FIG. 4. Hence, if the wheel unit 4 rotates, the bottom object 11 loses the contact with the lower surface 5.

The destacker unit can be used in a destacker system comprising plurality of hereby-disclosed destacker units. FIG. 3 and FIG. 4 show one embodiment of the presently disclosed destacking system and stack of trays seem from top and front, respectively.

The destacker system is designed to carry and destack a stack of trays 1. In the embodiment of the destacking system shown in FIG. 3 and FIG. 4, the destacking system comprises four destacker units. Each wheel unit 4 engages with a shaft 3. The inclined upper surface 16 of the each wheel unit 4 carries the stack of trays 1 having a flange 2 extending outwards along its perimeter.

The trays 1 are carried initially by the lower surface 5. During destacking, the wheel unit 4 rotates and the flange 2 of the tray above the bottom tray 12 interacts with the separator plate 7 and the bottom tray 11 is separated from the stack of trays. Upon further rotation, the tray above the bottom tray 12 engages with the inclined member 6 of the wheel unit 4. While the distance between the lower surface 5 and the inclined upper surface 16 increases, the distance 13 between the lower surface 5 and the bottom surface 26 of the inclined member 6 remains the same. As the stack of objects 1 slides on the inclined upper surface 16, the bottom object 11 slides on the lower surface 5 below the bottom surface 26 of the inclined member 6. Upon further rotation of the wheel units 4 in the same direction, the bottom tray 11 is displaced downwardly and destacked by the lower surface 5 and the bottom surface 26 of the inclined member 6, whereas the tray above the bottom tray 12 and stack of remaining trays slide on the inclined upper surface 16 as shown in FIG. 4.

Furthermore, the inclination 14 of the inclined upper surface 16 is selected to be in accordance with the pitch of the thread 3. The rotation of the wheel unit 4 is accompanied by a linear vertical displacement, such that the stack of objects on the inclined upper surface 16 shown in FIG. 2 and FIG. 4 has a limited displacement or maintained at a fixed planar height during destacking operation. While the stack of objects is sliding on the inclined upper surface 16, the lower surface 5 and bottom surface 26 of the inclined member 6 are displaced downwardly along with the wheel unit 4 with a vertical displacement larger than the displacement of the stack of objects on the inclined upper surface 16. Hence, when the bottom tray 11 loses contact with the lower plate 5, the vertical displacement of the bottom surface 26 of the inclined member 6 downwards plays a role in destacking of the bottom tray 11.

The rotational and vertical motion of the presently disclosed destacking system may be driven and controlled by an actuator, such as a linear actuator or a servo-motor. In FIG. 4, a pulley system 21 comprising rods 22 and a wheel 23 are shown. The rods 22 are engaged with the wheel unit 4 and the wheel 23 in a rigid manner. Preferably the pulley system 21 is coupled with a timing belt (not shown) driven by a linear actuator (not shown), such that the wheel unit 4 turns about its own rotational axis, at the same time it is pulled down due to the engagement with the threaded shaft 3, which is fixed.

Figure 5:
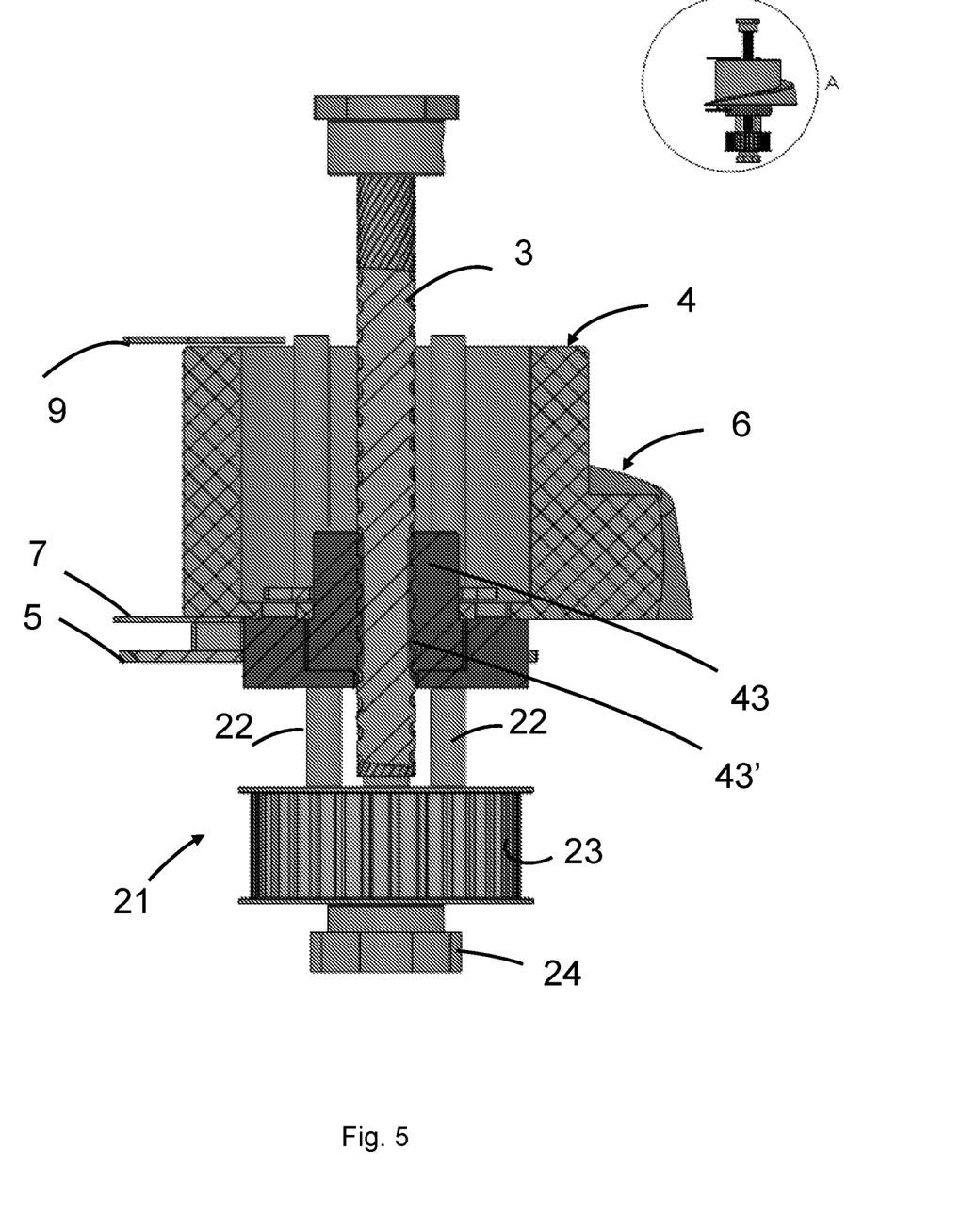
FIG. 5 shows the cross section of the wheel when used in the destacking system.

FIG. 5 shows the cross section of one embodiment of the presently disclosed wheel unit. A connector part 43 with a threaded hole 43' having the axis of rotation 34 of the wheel unit 4 provides the engagement of the threaded shaft 3 to the wheel unit 4 and the pulley system 21 to the wheel unit 4. The threaded shaft, for example a leadscrew, is connected to a leadscrew nut 24, such that when the wheel 23 of the pulley system 21 is rotated, the rods 22 and the wheel unit 4 will rotate around the axis of rotation 34 while engaging with the threaded shaft and while the threaded shaft will remain stable.

The invention claimed is:

1. A destacker unit for a destacking system such that a stack of objects each having a flange extending outwards along its perimeter is destacked in a predetermined direction by rotational motion of the destacker unit, wherein said destacker unit comprises:
   a wheel unit having a rotation axis, said wheel unit comprising:
      a lower surface for carrying the stacked objects, and
      an inclined member located above the lower surface, the inclined member having an inclined upper surface defining an inclination and a bottom surface such that a distance between the inclined upper surface and the bottom surface increases around at least a part of a periphery of the wheel unit,
   a connector part, engaging the wheel unit, the connector part defining a thread having an orientation, and wherein the orientation of the thread corresponds to the inclination of the inclined upper surface, wherein the inclination of the inclined surface is within +/−30% of a pitch of the thread, or within +/−20%, or within +/−10%, or within +/−5% of the pitch of the thread.

2. A destacker unit according to claim 1, wherein the inclination of the inclined surface corresponds to a pitch of the thread.

3. A destacker unit according to claim 1, further comprising a threaded shaft configured for engagement with the connector part.

4. A destacker unit according to claim 1, wherein the bottom surface is parallel to the lower surface.

5. A destacker unit according to claim 1, wherein said wheel unit further comprises a separator plate extending continuously and radially from a lower edge of the inclined member.

6. A destacker unit according to claim 1, wherein said wheel unit further comprises a spacer located between said inclined member and said lower surface for controlling the distance between the lower surface and the bottom surface of the inclined member.

7. A destacker unit according to claim 1, wherein said wheel unit further comprises an engagement plate located above the inclined member.

8. A destacker unit according to claim 1, wherein said inclined member, said lower surface and said engagement plate are segments with circular periphery.

9. A destacking system comprising a plurality of destacker units according to claim 1.

10. A destacking system according to claim 9, configured such that destacking of at least one lowermost object of the stack of objects is achieved by rotating the wheel unit with a first direction of rotation and a predefined angle from a starting point.

11. A destacking system according to claim 10, configured for returning the destacker unit to the starting point by rotating the wheel unit with a second opposite direction of rotation such that destacking of at least a subsequent lowermost object can be achieved by repeating the rotating movement.

12. A destacking system according to claim 9, comprising an actuator configured to drive and control the rotational motion and a vertical displacement of the wheel units.

13. A destacking system according to claim 9, configured for synchronously reciprocating the wheel units back and forth in a semi-circular motion corresponding to a rotational motion during destacking operation.

14. A destacking system according to claim 9, configured such that said engagement plate enters between two adjacent objects in the stack of objects during destacking operation.

15. A method for destacking an object from a stack of objects, comprising the steps of
- providing a stack of objects arranged substantially vertical, each object having a flange extending outwards along its perimeter,
- providing a plurality of destacker units or a destacking system comprising said plurality of destacker units such that a stack of objects each having a flange extending outwards along its perimeter is destacked in a predetermined direction by rotational motion of at least one of the plurality of destacker units, wherein the at least one of the plurality of destacker units comprises:
  - a wheel unit having a rotation axis, said wheel unit comprising:
    - a lower surface for carrying the stacked objects, and
    - an inclined member located above the lower surface, the inclined member having an inclined upper surface defining an inclination and a bottom surface such that a distance between the inclined upper surface and the bottom surface increases around at least a part of a periphery of the wheel unit,
  - a connector part, engaging the wheel unit, the connector part defining a thread having an orientation, and wherein the orientation of the thread corresponds to the inclination of the inclined upper surface,
- separating at least one lowermost object from the stack of objects by means of the destacker units by carrying a bottom object of the stack object on the lower surface and engaging the flange of an object above the bottom object with the inclined member, and
- rotating and vertically displacing the wheel units such that the bottom object is displaced downwardly and destacked by the inclined members whereas the stack of remaining objects slides on the inclined upper surfaces.

16. A method for destacking an object according to claim 15, wherein the stack of remaining objects are maintained at a fixed planar height while sliding on the inclined upper surfaces of the inclined members.

17. A destacking system according to claim 9, wherein the actuator is a linear actuator or a servo-motor.

18. A destacking system comprising a plurality of destacker units such that a stack of objects each having a flange extending outwards along its perimeter is destacked in a predetermined direction by rotational motion of the destacker unit, wherein at least one of the plurality of destacker units comprises:
- a wheel unit having a rotation axis, said wheel unit comprising:
  - a lower surface for carrying the stacked objects, and
  - an inclined member located above the lower surface, the inclined member having an inclined upper surface defining an inclination and a bottom surface such that a distance between the inclined upper surface and the bottom surface increases around at least a part of a periphery of the wheel unit,
- a connector part, engaging the wheel unit, the connector part defining a thread having an orientation, and wherein the orientation of the thread corresponds to the inclination of the inclined upper surface, wherein the inclined member is configured such that during the first rotational motion of the wheel unit, the inclined member separates at least one lowermost object from the stack of objects.

19. A destacking system comprising a plurality of destacker units such that a stack of objects each having a flange extending outwards along its perimeter is destacked in a predetermined direction by rotational motion of the destacker unit, wherein at least one of the plurality of destacker units comprises:
- a wheel unit having a rotation axis, said wheel unit comprising:
  - a lower surface for carrying the stacked objects, and
  - an inclined member located above the lower surface, the inclined member having an inclined upper surface defining an inclination and a bottom surface such that a distance between the inclined upper surface and the bottom surface increases around at least a part of a periphery of the wheel unit,
- a connector part, engaging the wheel unit, the connector part defining a thread having an orientation, and wherein the orientation of the thread corresponds to the inclination of the inclined upper surface, configured such that the stack of objects resting and sliding on the inclined upper surface is maintained at a fixed planar height during destacking of said at least one lowermost object.

* * * * *